United States Patent
Babayants et al.

(10) Patent No.: US 11,830,636 B2
(45) Date of Patent: Nov. 28, 2023

(54) CONTAINER FOR STORING, TRANSPORTING AND DISPOSAL OF RADIOACTIVE WASTE

(71) Applicant: CERAMIC TECHNOLOGIES LTD., Moscow (RU)

(72) Inventors: Gennady Ivanovich Babayants, Moscow (RU); Konstantin Gennadievich Babayants, Moscow (RU); Oleg Vitalievich Sharykin, Moscow (RU)

(73) Assignee: Ceramic Technologies Ltd., Moscow (RU)

( * ) Notice: Subject to any disclaimer, the term of this patent is extended or adjusted under 35 U.S.C. 154(b) by 73 days.

(21) Appl. No.: 17/642,178

(22) PCT Filed: Sep. 8, 2020

(86) PCT No.: PCT/RU2020/000483
§ 371 (c)(1),
(2) Date: Mar. 10, 2022

(87) PCT Pub. No.: WO2021/049974
PCT Pub. Date: Mar. 18, 2021

(65) Prior Publication Data
US 2022/0319727 A1    Oct. 6, 2022

(30) Foreign Application Priority Data
Sep. 13, 2019  (RU) .................. RU2019128906

(51) Int. Cl.
*G21F 5/00*    (2006.01)
*G21F 5/12*    (2006.01)
*G21F 5/005*   (2006.01)

(52) U.S. Cl.
CPC ............... *G21F 5/005* (2013.01); *G21F 5/12* (2013.01)

(58) Field of Classification Search
CPC ................. G21F 5/005; G21F 5/12
(Continued)

(56) References Cited

U.S. PATENT DOCUMENTS

2015/0228363 A1* 8/2015 Dewan .................. G21C 1/22
                                                    376/458

FOREIGN PATENT DOCUMENTS

| JP | S 60 22700 A | 2/1985 |
| RU | 2 479 876 C1 | 4/2013 |

OTHER PUBLICATIONS

Pavlov, D. I., et al. Sostoianie i osnovnye napravlenia sozdania parka konteinerov dlia konditsionirovania i zakhoronenia radioaktivnykh otkhodov, Yadernaya I Radiatsionna Ya Bezopasnost, No. 3 (81)—2016, p. 1-10, fig. 1-6, retrieved from: <https://www.secnrs.ru/publications/nrszine/3-81-2016/radioactive%20waste%20disposal.pdf#page=6&zoom=auto,-118,585> (12 pages).
(Continued)

*Primary Examiner* — Nicole M Ippolito
(74) *Attorney, Agent, or Firm* — Finnegan, Henderson, Farabow, Garrett & Dunner LLP

(57) ABSTRACT

The invention relates to the field of nuclear technology. A container for storing, transporting and disposal of solid radioactive waste comprises a cask made of reaction-sintered silicon carbide comprising free silicon in an amount of 3-30 wt. % with a layer of gas-phase silicon carbide deposited on the surface thereof. The outer layer of the cask is made of a metal foam with an open porosity of 60-70% and a pore size of 5-6 mm; the pores are filled with boron carbide powder having a dispersity of 40-50 μm, which protects the environment from nuclear radiation emitted by HLW. A
(Continued)

canister made of stainless steel with a thickness of 1-1.5 mm and intended for receiving radioactive waste is placed inside the silicon carbide cask. A 5 mm gap between the inner surface of the silicon carbide cask and the stainless-steel canister is filled with boron carbide powder which protects the environment from nuclear radiation emitted by HLW. The silicon carbide cask is sealed with a cover made of silicon carbide using a reaction welding method. A metal foam used as the metal foam with open porosity is selected from a group of metals comprising titanium, aluminum, copper, and the like. The invention makes it possible to increase the strength of a container for solid radioactive waste.

3 Claims, 1 Drawing Sheet

(58) Field of Classification Search
USPC ......... 250/505.1, 506.1, 507.1, 515.1, 516.1, 250/517.1, 518.1, 519.1
See application file for complete search history.

(56) References Cited

OTHER PUBLICATIONS

English Translation of the International Search Report for PCT Application No. PCT/RU2020/000483, dated Feb. 4, 2021 (one page).

* cited by examiner

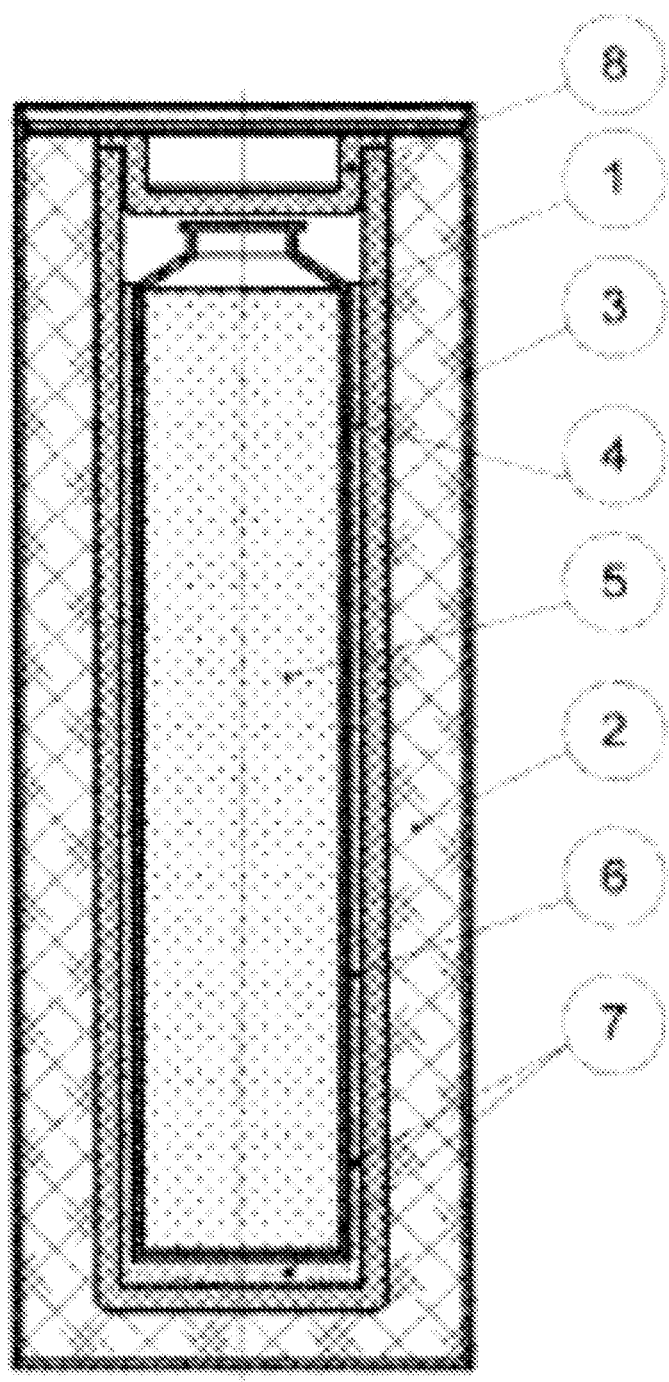

CONTAINER FOR STORING, TRANSPORTING AND DISPOSAL OF RADIOACTIVE WASTE

This application is a national stage filing under 35 U.S.C. § 371 of International Application No. PCT/RU2020/000483, filed on Sep. 8, 2020, which claims priority to Russian Patent Application No. RU 2019128906, filed on Sep. 13, 2019. The contents of each of these applications are incorporated herein by reference in their entirety.

The invention relates to the field of nuclear technologies, in particular to devices for protecting the environment from environmentally hazardous materials, and can be used for storage, transportation and disposal of particularly toxic waste, such as radioactive waste from nuclear-power vessels, toxic materials of chemical industries and other harmful industrial waste.

The container is known, which can be used for solid radioactive waste, made in the form of a protective housing, made of steel with a steel capacity with waste placed inside, the space between the housing and the container is filled with a filler made of formaldehyde resins (U.S. Pat. No. 4,377,509, G21F 9/24, 1983).

The disadvantage of the known container is the unsatisfactory reliability of waste disposal associated with insufficient corrosion resistance of this container. The container is known that can be used for solid radioactive waste, made in the form of a multilayer housing in which one of the intermediate layers is made of silicon carbide (application of Japan No. 60-022700, G21F 9/36, 1985).

The disadvantage of this container is unsatisfactory strength characteristics due to the fragility of the silicon carbide layer, which reduces its operational reliability during technological operations related to waste loading, moving the container during its transportation and loading into a transport container made of concrete or cast iron.

The closest to the claimed invention in terms of technical essence and the achieved result is a container for solid radioactive waste containing a canister made of reactively sintered silicon carbide containing free silicon in an amount of 3-30% wt., on the surface of which a layer of gas-phase silicon carbide is applied (Patent RU No. 2140402, G21F 5/005, 1998).

The disadvantage of the known container for storage, transportation and disposal of solid radioactive waste is the low impact strength of the silicon carbide canister, which is further reduced, since radioactive waste is placed in the container by pouring vitrified waste having a temperature of 1200° C. into the silicon carbide canister. This leads to the occurrence of thermal stresses in the canister, and after cooling of the vitrified waste—residual stresses, which reduces its operational reliability during technological operations: loading waste, moving the container during its transportation and other manipulations. In addition, the disadvantage of the container is the lack of environmental protection against radiation emanating from radioactive waste.

The purpose of this invention is to increase the strength of the container for solid radioactive waste and its reliability, as well as to protect the environment from radiation emanating from HLW.

This purpose in view is achieved in such a way, that the outer layer of the canister from the reaction sintered silicon carbide containing free silicon in the amount of 3-30% wt., the surface of which is covered with a layer of gas-phase silicon carbide, made of foamed metal (foam aluminum, foam titanium, copper foam, etc.) in the particular case of foam aluminum with a porosity of 60-70%, pore size of 5 to 6 mm, the pores are filled with powder $B_4C$ with a dispersion of 40-50 microns, which protects the environment from radiation emanating from the HLW.

The causal relationship between the achievement of the set goal and the distinctive features of the invention is as follows:

To reduce the impact force to the values, ensuring the integrity of the silicon carbide canister in case of a possible impact during technological operations (loading waste, moving the container when it is loaded into a transport container and other actions), the outer layer of the container is made of foam metal with an open porosity of 50-60%, pore size of 5-6 mm, the pores are filled with boron carbide powder with a dispersion of 40-50 microns, which protects the environment from radiation emanating from HLW.

To reduce residual stresses in the silicon carbide canister the contact of molten vitrified highly active waste with the wall of the silicon carbide canister is excluded, for which the vitrified molten highly active waste is poured into a steel capacity placed in a silicon carbide canister with a gap between the wall of the capacity and the canister of 5 mm, into which boron carbide powder with a dispersion of 100-150 microns is poured.

The parameters of the outer layer (the thickness of the aluminum foam protecting the canister from destruction, its porosity, pore size, the amount of powder placed in the pores) depend on the size of the canister and its weight. The determination of these parameters was carried out by mathematical methods, all calculations were performed in the ANSIS program. As initial data, the weight of the container was 170 kg, the strength of the canister material was 270 MPa, the stresses in the canister when falling from a height of 1.2 m should not exceed 20-25 MPa. Under these conditions, the results of calculations are as follows: the thickness of the foam aluminum layer with a porosity of 60-70%, the pore size of 5-6 mm is 110 mm.

IMPLEMENTATION EXAMPLE

The proposed design is implemented as follows:

The canister made of silicon infiltrated silicium carbide is manufactured using the following technology. A billet with the required geometry is pressed from the charge of the required formulation by hydrostatic pressing, then thermal operations are carried out—polymerization at T=150° C., carbonation at T=900° C., silicification at T=1500° C., resulting in a silicon carbide canister with the content of free silicon of 3-30% wt. After sandblasting, a layer of silicon carbide is applied to the outer surface of the canister by the gas-phase method. On the outer surface of the canister obtained in this way, a layer of foam metal with a thickness of 110 mm 15 (foam aluminum, foam titanium, foam copper, etc.) is placed, a 1.5 mm thick steel shell ring is placed on top of the foam metal. The pores of the foam metal are filled with powder $B_4C$ with a dispersion of 40-50 microns (see FIG. 1).

Test Results

The container made in accordance with the prototype collapsed when falling on a steel plate from a height of 1.2 m, because the level of stresses caused by the impact exceeds the strength of silicon carbide, which is 250 MPa.

Experimental determination of the stability of the geometry and tightness of experimental containers with a silicon carbide canister with an outer layer of aluminum foam with a porosity of 50-60%, a pore size of 5-6 mm, with a backfill of boron carbide powder with a dispersion of 40-50 microns was carried out on the stands of the Test Center "TSNII-MASH-ANALITIKA-PROCHNOST" during throw tests from a height of 1.2 m.

The following results were obtained:
during a vertical fall of the container with a silicon carbide canister with a can simulator containing HLW, it retained its integrity and tightness;
during a vertical fall of the container on the side surface horizontally—the silicon carbide canister with a can simulator containing HLW, it retained its integrity and tightness;
during a vertical fall of the container on the side surface at an angle of 45°—the silicon carbide canister with a can simulator containing HLW, it retained its integrity and tightness;

During the throws, the stresses that occurred in the canister did not exceed 10-15 MPa.

The obtained positive test results of the canister when falling from a height of 1.2 meters indicate a satisfactory agreement of the preliminary calculated estimates with the experiment and the compliance of the strength and reliability of the container with the required properties.

Thus, the proposed container for the storage, transportation and disposal of radioactive waste in comparison with the known container (Patent RU No. 2140402, G21F 5/005, 1998) provides increased strength and reliability for the storage and disposal of radioactive waste, as well as environmental protection from radioactive radiation.

Boron carbide powder placed in the gap between the container with HLW and the inner surface of the silicon carbide canister, as well as placed in a layer of aluminum foam, reduces the intensity of radiation to background values.

BRIEF DESCRIPTION OF THE DRAWING

FIG. 1 shows the drawing of a container for the storage, transportation and disposal of highly toxic waste, such as radioactive waste from nuclear power plants, nuclear-powered vessel, toxic materials of chemical industries and other harmful industrial waste.

The container includes (FIG. 1):
1—a canister made of silicon infiltrated silicium carbide;
2—a layer of foam metal with communicating pores and a porosity of 60-70%, the pores of which are filled with boron carbide powder;
3—metal shell ring;
4—steel canister filled with highly active waste;
5—highly active waste;
6—the gap between the canister and the inner surface of the canister;
7—filling of boron carbide powder;
8—the lid of the canister made of silicon infiltrated silicium carbide, welded to the canister by reaction welding.

The invention claimed is:

1. A container for storing, transporting and/or disposing of solid radioactive waste, the container comprising:
a cask made of reaction-sintered silicon carbide comprising free silicon in an amount of from 3 to 30 weight percent with a layer of gas-phase silicon carbide deposited on the surface thereof, wherein the outer layer of the cask is made of a metal foam having pores with an open porosity of from 60 to 70% and a pore size of from 5 to 6 mm,
wherein the pores are filled with boron carbide powder having a dispersity of from 40 to 50 microns;
a canister inside the cask, wherein the canister is made of stainless steel with a thickness of from 1 to 1.5 mm and is for receiving solid radioactive waste;
a 5 mm gap between an inner surface of the cask and the canister, wherein the 5 mm gap is filled with boron carbide powder; and
a cover sealing the cask, wherein the cover is made of silicon carbide.

2. The container according to claim 1, wherein the metal foam is selected from the group consisting of aluminum foam, copper foam, nickel foam, steel foam, and bronze foam.

3. The container according to claim 1, wherein the boron carbide powder protects the environment from nuclear radiation emitted by radioactive waste.

* * * * *